Figure 1:
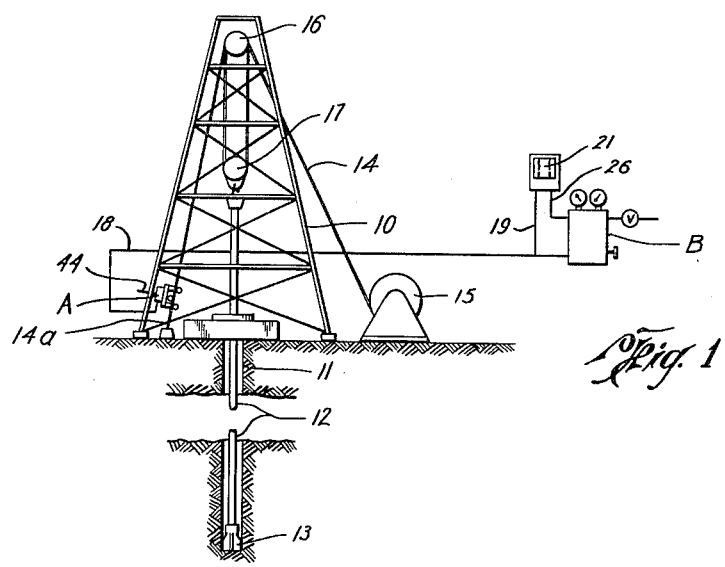

Dec. 7, 1954  R. E. CONNER  2,696,111
DRILL STRING WEIGHT INDICATING APPARATUS
Filed Feb. 2, 1951  2 Sheets-Sheet 1

Ray E. Conner
INVENTOR.

ATTORNEYS

Dec. 7, 1954  R. E. CONNER  2,696,111
DRILL STRING WEIGHT INDICATING APPARATUS
Filed Feb. 2, 1951  2 Sheets-Sheet 2
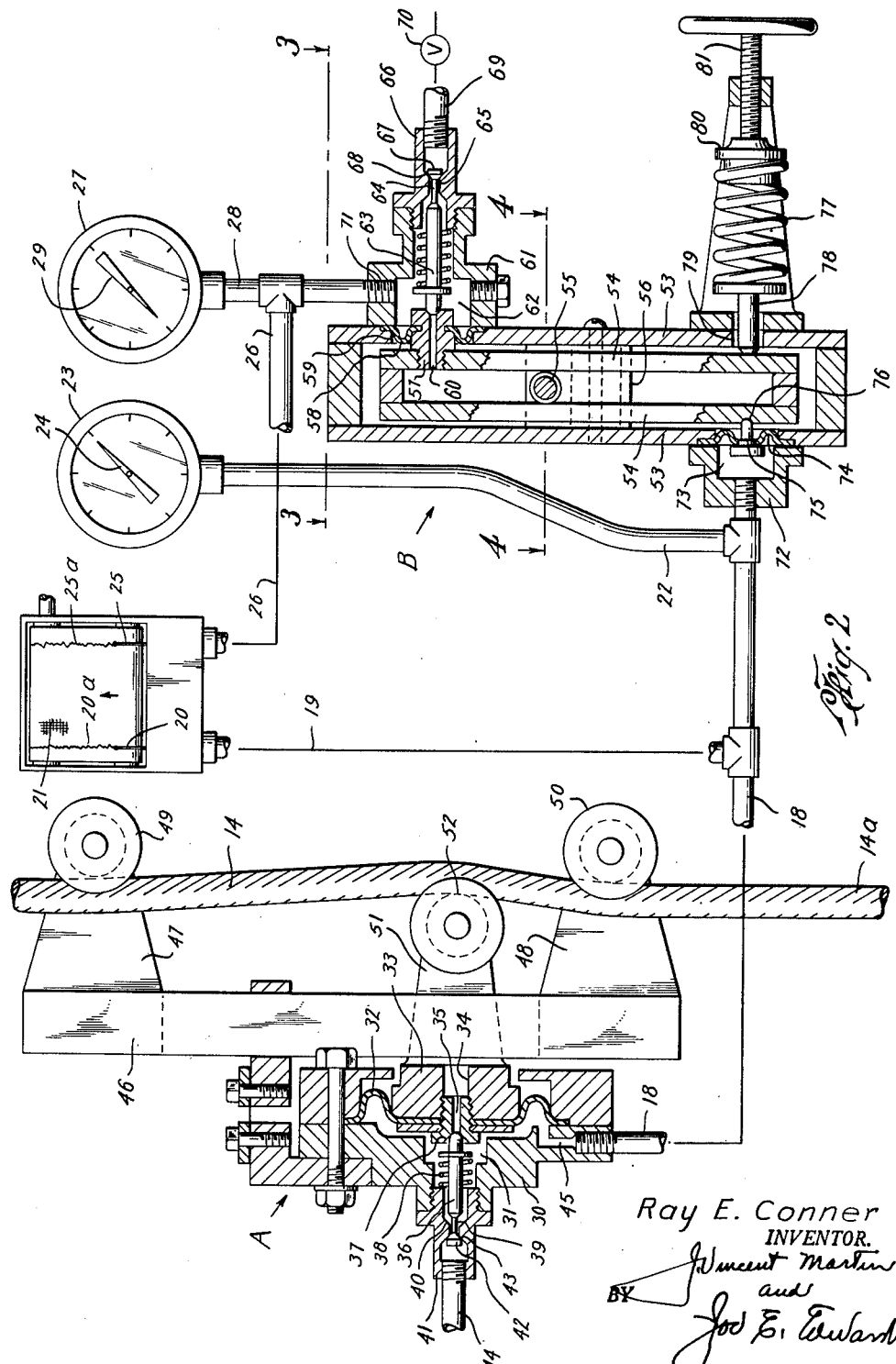
Ray E. Conner
INVENTOR.
BY Vincent Martin
and
Jod E. Edwards
ATTORNEYS

United States Patent Office 2,696,111
Patented Dec. 7, 1954

2,696,111

DRILL STRING WEIGHT INDICATING APPARATUS

Ray E. Conner, Houston, Tex., assignor to Warren Automatic Tool Company, Houston, Tex., a corporation of Texas Application February 2, 1951, Serial No. 209,067

3 Claims. (Cl. 73—151)

This invention relates to new and useful improvements in weight indicating apparatus.

One object of the invention is to provide an improved indicating apparatus for accurately measuring and indicating the total weight of a drill pipe suspended within a well bore and also for accurately measuring and indicating the weight of the drill bit on the bottom of said bore.

An important object of the invention is to provide an improved weight indicating apparatus wherein the weight of the drill pipe or drill string is transposed into a fluid pressure which is representative of said weight, together with means for utilizing said fluid pressure for actuating a suitable indicating apparatus.

A still further object is to provide an improved apparatus for measuring and indicating total weight of the drill string as well as weight of the bit on bottom, which apparatus is so constructed as to be unaffected by temperature variations to assure accurate indications at all times.

Still another object of the invention is to provide an apparatus of the character described, wherein the total weight of the drill string is converted into a predetermined pressure of a pressure fluid and also wherein the pressure fluid is employed to actuate a variable ratio device, whereby the variation in pressure due to a portion of the drill string being supported by engagement of the bit on bottom may be utilized to actuate a bit on bottom indicator.

A still further object is to provide an apparatus wherein one source of fluid pressure is utilized to operate both the total weight indicator and the weight on bit indicator so that the two indications are constantly correlated and function as a check, one against the other.

Other and further objects of the invention will appear from the description of the invention.

Figure 3:
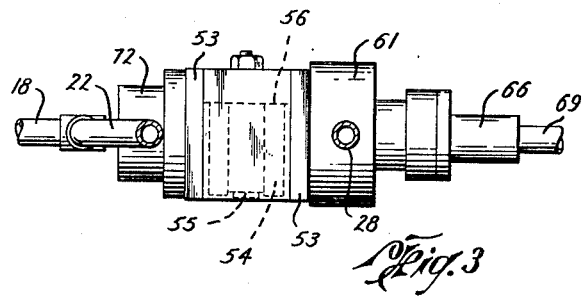
Figure 4:
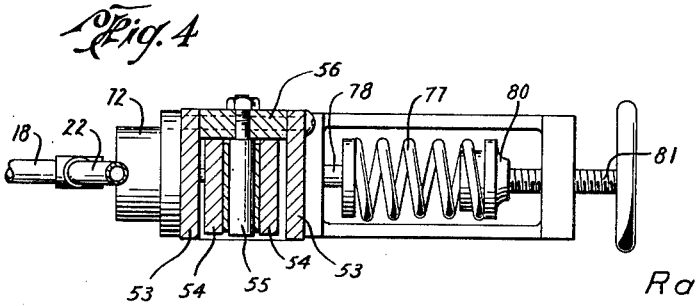

In the accompanying drawings, which form a part of the instant specification, which are to be read in conjunction therewith and wherein like reference numerals are used to indicate like parts in the various views:

Figure 1 is a schematic view of a well derrick illustrating the method of suspension of the drill pipe within the well bore and showing the point of connection of the dead line of the suspending cable with the improved measuring and indicating apparatus, Figure 2 is a view partly in section and partly in elevation of an improved apparatus, constructed in accordance with the invention, Figure 3 is a horizontal cross-sectional view taken on the line 3—3 of Figure 2, and Figure 4 is a horizontal cross-sectional view taken on the line 4—4 of Figure 2.

In the drawings the numeral 10 designates a well derrick which is disposed in the usual manner above a well bore 11. The usual drill pipe or string 12 having a drill bit 13 on its lower end is suspended by means of the usual suspending cable 14. One end of the cable is wound upon the reel or drum 15 and the cable passes upwardly over the usual crown block 16 in the upper end of the derrick and is then threaded downwardly about the usual traveling block 17. The dead end 14a of the cable is secured to a suitable stationary support at one side of the derrick. The foregoing is the usual arrangement for suspending a drill pipe or string and for lowering and raising the same within the well bore 11.

The improved indicating apparatus which forms the present invention is adapted to be actuated from the dead line 14a of the cable and the control unit A (Figure 2) of the apparatus is arranged to be applied to the cable as will be hereinafter explained. A pressure line 18 which extends from the unit A contains a fluid pressure which is representative of the weight of the drill string. This pressure line has connection through a line 19 with the operating mechanism (not shown) of a stylus 20. This stylus is adapted to traverse a recording chart 21 which is operated or moved by means of a clock mechanism in the usual manner of this type of recording device. As will be explained in detail, the pressure within line 18 and line 19 is representative of total weight of the drill string 12 and variations in this pressure will actuate the stylus 20 whereby the indication 20a made by said stylus on the chart 21 provides a record of the total weight of the drill pipe.

To provide a visual indication a line 22 is connected with the line 18 and has a pressure gauge 23 secured to its terminal end whereby the pressure in line 18 will actuate the indicator 24 of the gauge 23. The scale on the gauge 23 is calibrated to indicate pounds of weight of the entire drill string.

For indicating the weight of the bit on bottom, that is, the amount of weight imposed on the drill bit 13 when it engages the formation, the line 18 also has connection with a pressure responsive device or variable ratio device B. As will be explained, a second stylus 25 is provided on the recording chart 21 and its operating mechanism is actuated through a line 26 which connects the stylus mechanism with the device B. The line or indication 25a made by the stylus 25 provides a record of the variations of the weight of the bit on bottom. In addition to the stylus 25 a visual indication of the weight of bit on bottom is provided by a second pressure gauge 27 which has connection through a line 28 with the device B and the indicator 29 of the gauge 27 provides a constant visual indication of the variations in the weight of the bit on bottom.

The control unit A is a force balance device which includes an outer casing 30 having a chamber 31 therein. One side of the chamber is formed by a flexible diaphragm 32, which diaphragm has its inner peripheral portion attached to a block member 33. The block member has an axial or central passage 34 and a vent bushing 35 is secured within the inner end of this passage. One end of a valve stem 36 engages a seat 37 provided at the inner end of the vent bushing and is normally held in engagement therewith by a spring 38. The outer end of the valve stem is formed with a reduced shank 39 which extends through a passage 40 in a valve housing 41 and the outer end of this stem has a valve head 42 secured thereto. This valve stem is arranged to engage a valve seat 43 within the housing. A suitable fluid supply such as air under a predetermined pressure is conducted into the valve housing 41 through an inlet pipe 44. The pressure line 18 has connection with a passage 45 which communicates with the chamber 31.

It will be evident that when the block member 33 is moved inwardly of the chamber 31 the vent opening 35 is closed and the valve head 42 is unseated, whereby the air pressure may enter the chamber 31. As soon as the pressure enters the chamber it acts against the diaphragm 32 to move the diaphragm outwardly and reseat the valve head 42. Subsequent applied force to the block member 33 again unseats valve head 42 to allow additional pressure into the chamber 31 and therefore into the line 18, but such additional pressure again immediately reseats the valve 42. In this manner the pressure is built up in the chamber 31 and in the pressure line 18 directly in accordance with the amount of force being applied to the block member 33. If the force being applied to the member 33 is reduced below the amount of force being exerted by the pressure within the chamber 31 then the diaphragm and block member are moved outwardly to unseat the valve stem 36 from the vent opening 35 and allow some escape of pressure from the chamber until a balanced condition between applied force and pressure within the chamber is reached. It is therefore obvious that through the unit A the pressure in the line 18 is in proportion to the force being applied to block 33 and is thereby representative of this force.

For converting the weight of the drill pipe into an applied force, which may then be transposed into pressure in the line 18, the outer casing 30 of the unit A is provided with a bracket 46 having arms 47 and 48 at its upper and lower ends. Idler pulleys 49 and 50 are carried by the arms 47 and 48, respectively, and engage the drill pipe suspending cable 14 at the dead end 14a thereof. The block member 33 is also formed with a bracket arm 51 which carries a third pulley or roller 52 and the roller 52 is disposed to place a kink or offset in the cable, as is clearly illustrated in Figure 2. It will be evident that the weight of the drill pipe will tend to straighten the cable to eliminate the offset portion caused by the passage of the cable between the rollers, and this tendency of the cable to straighten will apply a direct force to the block member 33. This force will be proportional to the weight of the drill pipe and as the drill pipe weight increases a greater force will be applied to the block member, which will result in an increase or a building up of the pressure in the line 18; similarly, a reduction in drill pipe weight will decrease the applied force to the block member 33, and this will result in a reduction in the pressure in line 18. It is therefore evident that the pressure within line 18 is directly proportional to the weight of the drill pipe and may be said to be representative thereof.

It is pointed out that the particular fluid which is employed is preferably air so that the operation of the unit will be substantially unaffected even by extreme temperature changes.

Since the pressure within the line 18 is representative of total weight, this pressure is directly indicated on the total weight indicator gauge 23 as well as by the recording stylus 20. When the drill pipe is lowered to engage the bit with the bottom of the hole, a portion of the weight of the drill string will be carried by the bit, and this will result in a reduction in the applied force to block member 33, with a similar reduction in the pressure in line 18. Therefore, as soon as this occurs the gauge 23 and the stylus 20 will be actuated to show a reduction in total weight of the drill string. To positively and simultaneously indicate the amount of the weight of the bit on the bottom of the hole, the variable ratio device B is provided. This device comprises an outer casing 53 having an actuating arm 54 pivotally mounted to swing about a pivot 55. The pivot is carried by a pivot block 56 which is adjustable longitudinally of the casing 53, whereby the pivot point of the actuating or control arm 54 may be readily varied. One end of the arm 54 is connected through a bushing member 57 with the inner periphery of a diaphragm 58, which diaphragm spans an opening 59 in the outer casing. The bushing 57 is formed with a vent opening 60 therein.

A housing 61 encloses the diaphragm 58 and has a chamber 62 formed therein. The inner end of a valve stem 63 normally closes the vent 60 in the diaphragm bushing 57 and the outer end of the stem is formed with a reduced portion 64 extending through a passage 65 in a valve housing 66. A valve head 67 is adapted to engage a valve seat 68 within the housing and said housing has connection through a line 69 with a regulated air supply. A suitable regulator 70 may control the pressure of the air supply flowing through the line 69. The line 28 extending from the weight on bit indicator 27 has connection with an opening 71 which extends into the chamber 62.

When the control arm 54 is swung in a direction to move the valve stem 63 in a direction to the right in Figure 2, the valve head 67 is unseated and pressure is introduced into the chamber 62. This pressure acting against diaphragm 58 balances the forces applied by the control arm 54 and the valve head 67 is reseated. Additional applied force by the control arm may again unseat the valve 67 to build up the pressure in chamber 62 and in the lines 28 and 26 extending to the weight on bit indicators and recorders. Any movement of the control arm 54 in a direction which will allow movement of the diaphragm and bushing 57 away from the valve stem 63 will allow a venting of pressure from the chamber 62 through the bushing 60 to thereby reduce pressure in chamber 62. It is therefore obvious that the pressure within the chamber 62 is controlled by the force applied by one end of the pivoted control or actuating arm of the device B, and this pressure is representative of the weight on bit.

For actuating the control arm 54 in accordance with the variations in pressure in the line 18, as caused by the application of weight on bit, the casing 53 of the device B is formed with a housing 72 providing a chamber 73 therein. This chamber is connected to one end of the pressure line 18 so that the pressure in line 18 is always present in the chamber 73. The inner portion of the chamber is closed by a diaphragm 74 and a central pin 75 extends through the diaphragm and has its inner end engaging a recess 76 in the control arm. Directly opposite the pin 75 and resisting a swinging movement of the arm 54 is a coil spring 77 which has one end engaging a pin 78 which extends through an opening 79 in the casing 53. The pin 78 contacts the arm and the opposite end of the spring 77 is engaged by a follower 80 which has contact with an adjusting screw 81. By manipulating the screw 81 the pressure of the spring 77 may be varied and obviously such spring resists movement of the control arm by the pressure within the line 18 and within the chamber 73.

In the operation of the device the total weight of the drill string is converted through the unit A into air pressure within the line 18 and with the drill string suspended in the hole off bottom, a pressure representative of drill string weight is present in the line 18 and in the chamber 73. At this point the spring 77 is adjusted to exactly balance the pressure in chamber 73 in a manner to bring the indicator 29 of the weight on bit indicator to "zero" position. At such time the indicator 23 as well as the stylus 20 provide an indication of the total weight of the drill string.

When the bit is lowered into contact with the formation a portion of the total drill string weight is taken by the bit which means that a slackening of the dead line will occur and a reduced force will be applied through block 33 of the unit A to reduce the pressure in the line 18. This reduction in pressure will be directly in accordance with the change in total weight and the difference between the initial total weight indication and the new indication on gauge 23 will actually be the weight on the bit. As the pressure reduction occurs in line 18 and chamber 73 the force of the spring 77 will tend to swing the control arm 54 of the device B whereby the opposite end of the arm swings in a direction to unseat the valve 67. Pressure is thus admitted into the chamber 62 through the line 69, and this pressure operates the indicator 29 of the weight on bit gauge as well as the stylus 25. By proper control of the pressure in the chamber 62 as it relates to the scale on the gauge 27, it will be evident that variations in the pressure line 18 may be utilized to properly indicate the weight on bit gauge.

From the foregoing, it will be evident that the operator has at all times an indication of the total weight of the drill string and as the bit engages the bottom of the hole the reduction in total weight as reflected by the gauge 23 and the stylus 20 is indicated as weight on bit by the gauge 27 and stylus 25. Since both indicators are controlled in their actuation by the same pressure, which is the pressure in the line 18, an accurate indication of both total weight and weight on bit is given at all times. As has been stated it is desirable to employ air as the pressure fluid which will assure that the apparatus will operate accurately and will be substantially unaffected by temperature variations.

It is pointed out that the adjustability of the pivot pin 55 on which the control arm 54 is pivoted makes it possible to change the pivot point with respect to the ends of the control arm. Because applied force of the pressure in line 18 acts on one end of the arm and because the opposite end of the arm is connected to the valve which controls the pressure in the chamber 62 it is apparent that a change in the position of the pivot pin will change the ratio of the pressure which is built up in chamber 62 with respect to the controlling pressure in the line 18. By obtaining an accurate control of the ratio between the controlling pressure in line 18 and the controlled pressure in chamber 62, it is apparent that the indicator 27 may be readily calibrated to indicate any proportional part of the varying pressure within the pressure line 18. This assures positive and accurate as well as sensitive indication by the indicators 25 and 27.

The arrangement of the pulleys 49, 50 and 52 which are engaged by the cable or line provides a satisfactory means for applying the force which is representative of the weight of the drill pipe to the control unit A. However, it is noted that the invention is not to be limited to this particular force applying means for it is evident that any suitable means which will apply the force from the cable to the unit A may be employed.

Having described the invention, I claim:

1. A weight indicating apparatus including, a pressure line having fluid under pressure therein, means for varying the fluid pressure within the line in accordance with and directly proportional to variations in the total weight of a drill string suspended in a well bore, whereby said fluid pressure is representative of the total weight of the string, a pressure-actuated indicator connected to the line for visually indicating the total weight of said drill string, a second pressure-actuated indicator, a pressure responsive actuating device connected between the pressure line and said second indicator, said device including a support, an actuating member mounted on said support, a pivotal connection between said actuating member and said support for pivotal movement of said member about the connection, a fluid pressure applying means for applying the pressure in said pressure line to said actuating member to pivot said actuating member in one direction about said connection, a force applying means for urging said member to pivot in an opposite direction from said one direction to balance the force of the pressure in said pressure line when the total weight of the drill string is suspended in the well bore, a second source of fluid pressure separate from the fluid in said pressure line, a pressure chamber connected with said second source of pressure, a connection between said second indicator and said chamber whereby the pressure in said chamber is indicated on said second indicator, valve means for controlling the inlet of fluid into said chamber from said second source of fluid pressure, means on said actuating member for actuating said valve means to admit fluid under pressure into said chamber from said second source when the pressure in the pressure line drops by reason of a part or all of the weight of the drill string being supported on the bottom of the well bore, the amount of fluid pressure admitted into said chamber being in accordance with the decrease in the pressure in the pressure line which decrease is in accordance with the decrease in the total weight of the drill string suspended in the well bore, whereby the pressure in said chamber is representative of the weight of the drill string on the bottom of the well bore and is indicated on said second indicator.

2. The structure set forth in claim 1, including a second valve means to discharge fluid pressure from said chamber, and means on said actuating member to actuate said second valve means to discharge fluid pressure from said chamber when the pressure in said pressure line increases by reason of an increase in the weight of the drill string suspended in the well bore.

3. The structure set forth in claim 1, wherein said second indicator is calibrated from "zero" which is indicated when the force applying means and the fluid pressure applying means are balanced and the total weight of the drill string is suspended in the well bore, to a maximum value which is indicated when the entire weight of the drill string is on the bottom of the well bore.

References Cited in the file of this patent

UNITED STATES PATENTS

| Number | Name | Date |
|---|---|---|
| 1,992,343 | Ahnstrom | Feb. 26, 1935 |
| 2,013,810 | Shimek | Sept. 10, 1935 |
| 2,248,322 | Annin | July 8, 1941 |
| 2,349,329 | Anderson | May 23, 1944 |
| 2,459,542 | Rosenberger | Jan. 18, 1949 |
| 2,494,781 | Stover | Jan. 17, 1950 |
| 2,528,883 | Hayward | Nov. 7, 1950 |